T. C. DAWSON.
SHAFT COUPLING.
APPLICATION FILED MAR. 23, 1911.

1,006,362.

Patented Oct. 17, 1911.

WITNESSES:

INVENTOR

UNITED STATES PATENT OFFICE.

THOMAS C. DAWSON, OF SMITHS FERRY, PENNSYLVANIA.

SHAFT-COUPLING.

1,006,362.

Specification of Letters Patent.

Patented Oct. 17, 1911.

Application filed March 23, 1911. Serial No. 616,462.

*To all whom it may concern:*

Be it known that I, THOMAS C. DAWSON, residing at Smiths Ferry, in the county of Beaver and State of Pennsylvania, a citizen of the United States, have invented or discovered certain new and useful Improvements in Shaft-Couplers, of which improvements the following is a specification.

In pumping oil from wells, the usual practice is to connect a sucker-rod, consisting of a series of relatively short rods (joined end to end), to a walking beam or jack. In order to join the rods together, where steel sucker-rods are employed, the ends of each section are usually equipped by the manufacturer with what are termed a "box" and a "pin", which are suitable metal sleeves rigidly secured to the rods; and, because the standard lengths of the rod sections seldom prove to be the exact length required to make connection to whatever pumping machinery is used, such connection is usually made through an intermediate length of wood sucker-rod.

My invention relates to a coupler, particularly applicable, although not limited, to the direct connection of a steel sucker-rod to a walking-beam, and the object of my invention is to provide a practical and efficient coupler.

Figure 1:
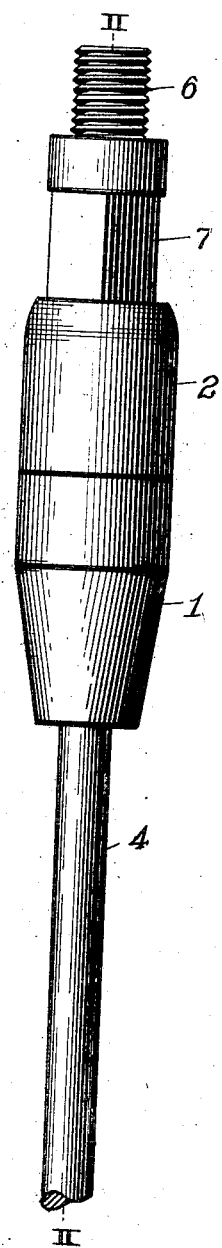
Figure 2:
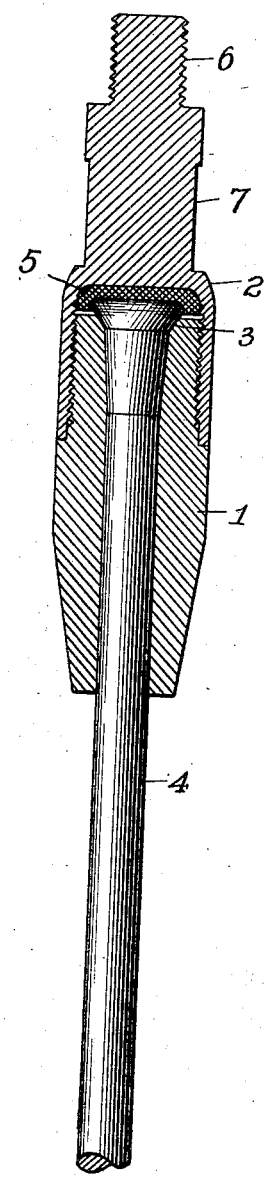

In the accompanying drawing, which forms part of my specification, Figure 1 is an elevation of my improved coupler engaging a rod, and Fig. 2 is a vertical sectional view taken on the line II—II, Fig. 1.

Like numerals are used to designate like parts.

As shown, the coupler preferably consists of a sleeve 1, suitably provided with a means of attachment, such as screw-threads, to the connecting piece 2. The upper end of the said sleeve 1 is suitably provided with a shoulder 3 to receive the upset end of a sucker-rod 4, and, to the end that the said upset rod will have no loose play, a suitable packing 5 may be inserted in the cup-shaped portion of the connecting piece. To secure the said connecting piece to a walking-beam I preferably form a threaded extension 6 on said piece, and an angular portion 7 may also be formed on said piece to form a means for engagement for a tightening wrench or elevators. And in this construction the extension 6 of the connecting piece 2 will preferably be of the same diameter as the screw-threaded portion of the "pin" usually secured to each sucker-rod section, to the end that the connection of the sucker-rod to the polished rod of the walking-beam may be the same regardless of whether the last section of rod has or has not been cut.

In making an attachment with my coupler the excessive length of the steel sucker-rod is cut off and the sleeve 1 is slipped over the extending portion, the end of which is then suitably upset. The said sleeve may then be raised into a position wherein the upset end of the rod is seated upon the shoulder 3 and the connecting-piece may then be screwed upon the sleeve.

It will be observed of my invention that I have provided a coupler whereby a sucker-rod may be easily connected to the polished rod of a walking-beam and wherein the full strength of the sucker-rod may be developed.

It will be observed that by providing the recessed shoulder or seat adjacent to the screw-threaded end of the sleeve, two advantages may be obtained. In the first place the end of the sucker-rod to be upset is open to the free manipulation of whatever upsetting tool may be used; and in the second place when there is a pull upon the rod, its flared upset end will act as a wedge to spring the externally threaded sleeve into close and unyielding engagement with the internally-threaded cup of the second member.

I claim as my invention:

1. In a coupler, the combination of an externally-threaded sleeve having at one end a recessed shoulder to receive an enlarged end of a rod, and a connecting member consisting of an internally-threaded closed cup-shaped portion with an extension whereby connection may be made to an operating element, substantially as described.

2. An attachment applicable to the upset end of a sucker-rod section, such attachment consisting of a body screw-threaded at one end, and at the other end provided with an internally-threaded cup of suitable size to take over the head upset on such rod, and a sleeve, said sleeve adapted to surround such rod and screw-threaded externally to engage said internally-threaded cup, said sleeve further provided with a shoulder at one end engaging the upset head of the rod from beneath when applied thereto and through its aforesaid screw-threaded engagement clamping said member to the aforesaid member.

In testimony whereof I have hereunto set my hand.

THOMAS C. DAWSON.

Witnesses:
PAUL N. CRITCHLOW,
ALICE A. TRILL.